United States Patent [19]
Dretzke

[11] 3,986,602
[45] Oct. 19, 1976

[54] CHAIN LINKS
[76] Inventor: Carl F. Dretzke, 777 Depot St., Manawa, Wis. 54949
[22] Filed: Aug. 20, 1975
[21] Appl. No.: 606,248

[52] U.S. Cl. .................................. 198/731; 59/85
[51] Int. Cl.² ........................................ B65G 19/20
[58] Field of Search ............... 198/176, 189; 59/85, 59/88, 89, 93; 74/245 R, 245 C, 250 R, 250 C

[56] References Cited
UNITED STATES PATENTS

| | | | |
|---|---|---|---|
| 1,941,899 | 1/1934 | Jennings | 198/189 |
| 2,080,301 | 5/1937 | Bocchino | 198/189 |
| 2,446,685 | 8/1948 | Barker | 74/245 R |
| 2,466,240 | 4/1949 | Joa | 198/189 |
| 2,580,786 | 1/1952 | Jewett et al. | 198/176 |
| 2,785,578 | 3/1957 | Nold | 198/189 X |
| 2,833,152 | 5/1958 | Hedlund et al. | 74/245 R |
| 3,055,485 | 9/1962 | Cordis | 198/229 X |
| 3,171,533 | 3/1965 | Ferg | 198/176 |
| 3,246,731 | 4/1966 | Ianson | 198/176 |

*Primary Examiner*—Evon C. Blunk
*Assistant Examiner*—Richard K. Thomson
*Attorney, Agent, or Firm*—Theodore J. Long; John M. Winter; Harry C. Engstrom

[57] ABSTRACT

A conveyor chain articulatable in two planes transversely of each other and normal to the direction of chain advancement. The chain has alternating link types. Alternate drive links have a body center defining a center aperture for receiving the cog of a sprocket wheel in driven relation and have end hooks portions which curve transversely toward the body center in spaced relation. Alternate attachment links have a perimeter body defining toroidal outer loops for removably engaging the hook portions of adjacent drive links and have a center section for engaging a transversely extending conveyor flight.

1 Claim, 5 Drawing Figures

CHAIN LINKS

BACKGROUND OF THE INVENTION

1. Field of the Invention

This invention pertains generally to improvements in conveyor chains and more particularly to improvements in the design of removably connected cooperable chain links.

2. Description of the Prior Art

Many chain link designs are in use for conveyor operations. Frequently, these designs have links of identical size and shape. Some designs have the additional attribute of manual link detachability. The purpose of a conveyor operation is often accomplished by attaching flights or paddles to some of the links in spaced relation. However, as a consequence of the presently available designs, the flights can typically be fastened only in one orientation to the links, and usually must be permanently fastened.

Continuous sprocket chains with permanently fastened flights are employed frequently as devices to clean barns. The flights scrape the animal waste and bedding to the outside of the barn through a trough in the floor. In order to realize the full labor-saving potential of the conveyor, the waste material is usually carried up an incline at the end of a cycle and expelled into a movable receptacle. A continuous chain used for this purpose thus executes both horizontal and vertical bends while it is laterally advanced through one cycle.

The wear produced by the multi-directional movement and by the strain from scraping heavy loads necessitates the occasional replacement of links or flights. The flights used with most previous hook-type chain designs must be welded to the links because if holes were made through the cross bars or side bars of the link for bolts of sufficient strength to support the conveyor flights and their loads, such holes would cause substantial weakening of the links. Wear of either the links or the flights welded to them requires replacement of the whole unit. Keeping spares of links with welded flights and spares of links without flights defeats the purpose of interchangeability of the links and adds to the cost and inconvenience of maintenance.

SUMMARY OF THE INVENTION

My invention provides a sturdy chain assembly which meets the demands of easy manual interchange of links, multidirectional movement of the chain, and convenient replacement of any attached flights.

The links of the chain assembly are all structurally indepedent. Each link is a single piece of metal which can be readily forged or cast from steel or alloyed materials. Each link may be manually engaged with or disengaged from adjacent links.

My chain links are of two types, which are alternated throughout the assembly, each link being completely interchangeable with others of its own type.

One type of link, hereinafter called the drive link, has an aperture in an otherwise solid body center so that the cog of a drive sprocket may engage the aperture and drive or guide the chain. Hook portions extend from each end of the drive link and curve transversely toward the body center in spaced relation thereto.

My other link type, hereafter called the attachment link, has a perimeter body which defines an outer loop at each end of the link for receiving and engaging the hook portions of adjacent drive links in manually removable relation. The attachment link also has a center section with an aperture through which a conveyor flight may be fastened. The link is designed so that the perimeter body and the solid portion of the center section are of comparable thickness, avoiding any structural weakening of the link because of the attachment aperture.

My drive link and attachment link form a sturdy combination, but are separable and individually serviceable when the circumstances demand. The aperture in the body center makes it convenient to fasten or replace flights with ordinary tools. Since the configuration of the attachment link is symmetric about its center, the link may be reversed. The curvature of the engaged drive link hook portions prevent disconnection of the links during ordinary use, but permit easy manual disconnection by the operator if desired.

The chain assembly is adaptable to a variety of tasks besides barncleaning. Because the links can pivot in either the horizontal or vertical plane, the assembly can be used to translate material in a fixed plane, raise and lower it, or both. The links may be replaced at any time at any location along the length of the assembly, replacement not being confined to the links near the drive unit.

Further objects, features, and advantages of my invention will be apparent from the following detailed description taken in conjunction with the accompanying drawings showing a preferred embodiment which exemplifies the features of my chain link assembly.

DESCRIPTION OF THE PREFERRED EMBODIMENT

Figure 1:
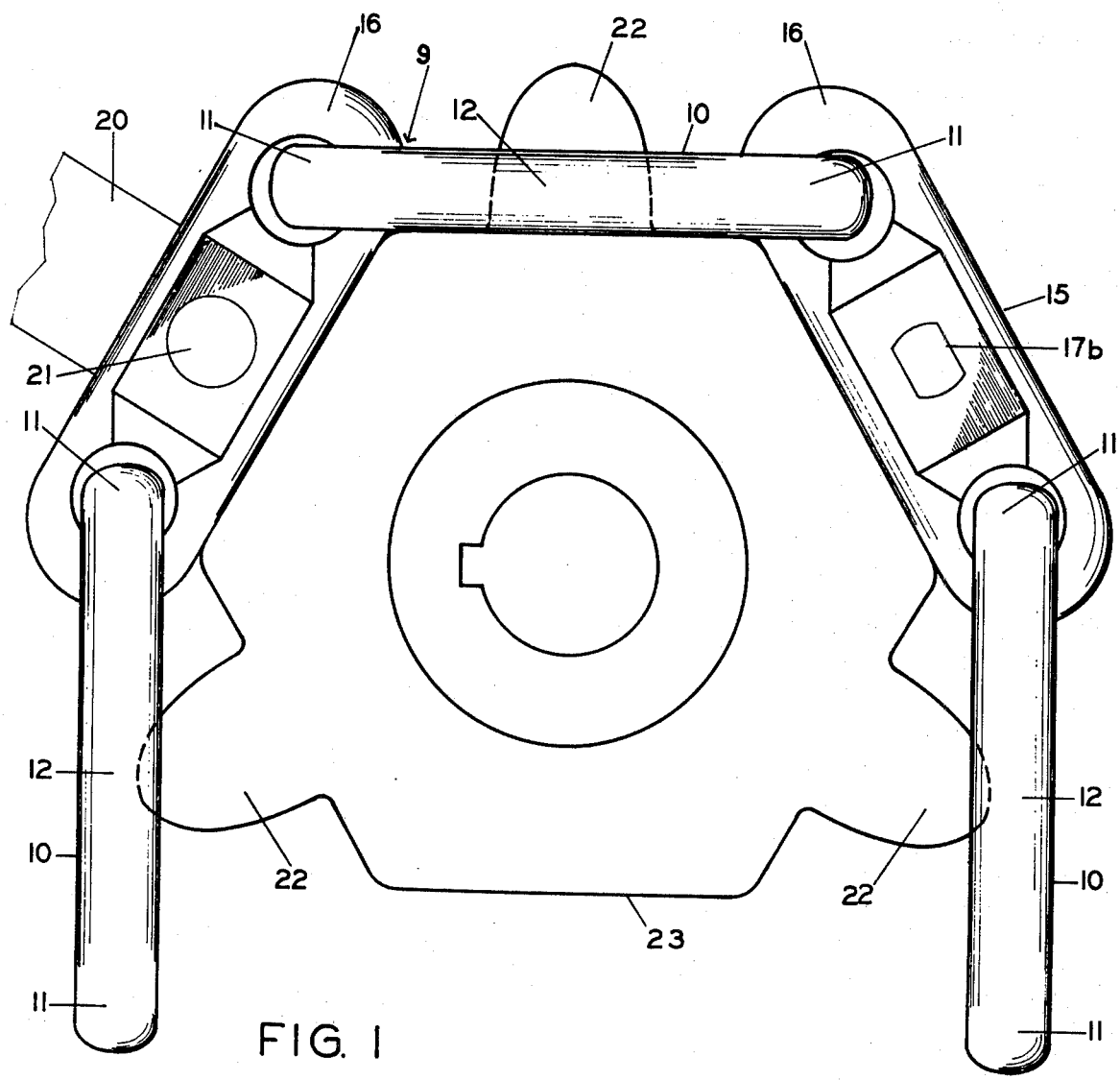
FIG. 1 is a top plan view of a portion of a preferred embodiment of my chain assembly which is engaged with a chain drive sprocket.
Figure 2:
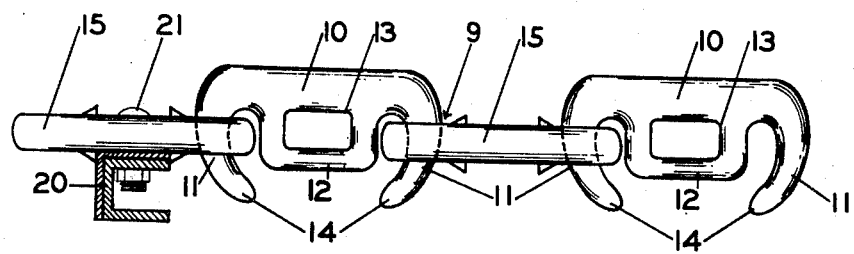
FIG. 2 is a side view of reduced scale showing a portion of my chain assembly.
Figure 3:
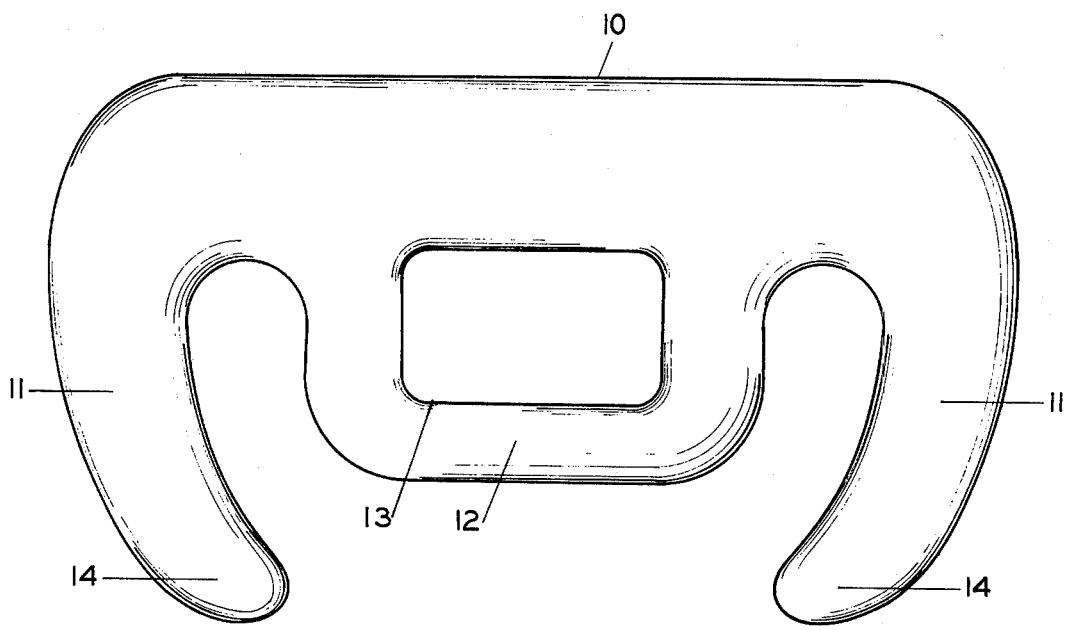
FIG. 3 is a side view of a drive link of the type employed in my preferred chain assembly.

Referring now more particularly to the drawings, wherein like numerals refer to like parts throughout the several views, my chain assembly is shown generally at 9 in FIGS. 1 and 2. As best shown in FIGS. 1 and 2, the chain assembly has two alternate types of links: a drive link 10 and an attachment link 15. The planes defined by the alternate drive link 10 and attachment links 15 are mutually perpendicular. Flights 20 may be fastened to any of the attachment links 15, as described more fully below.

The drive link 10 of my chain assembly is formed of a single piece of elongated steel or alloy. In the preferred embodiment, my drive link 10 resembles the letter *m*. The center portion of the drive link 10, called the body center 12, has an aperture 13 whose shape and position are designed to receive the drive cog 22 of a sprocket drive wheel 23 in driven relation. It is seen from FIG. 1 that a six-faced sprocket drive wheel 23 having a drive cog 22 on every second face of the wheel may be employed to drive my conveyor chain 9.

The drive link 10 additionally has a hook portion 11 extending from each end of the body of the link and curving transversely toward the body center 12 in spaced relation. The hook portions are substantially circular in cross section and are tapered toward their ends 14. Since the hook ends 14 do not close with the body center, the hook portions 11 can be manually engaged with adjacent link sections having a diameter less than the distance between the hook portions and the body center 12. The ends 14 of the hook portions curve back toward the body center 12 in an arc which exceeds 180°. Such curvature prevents undesired disconnection from adjacent links under conditions of ordinary use.

Figure 4:
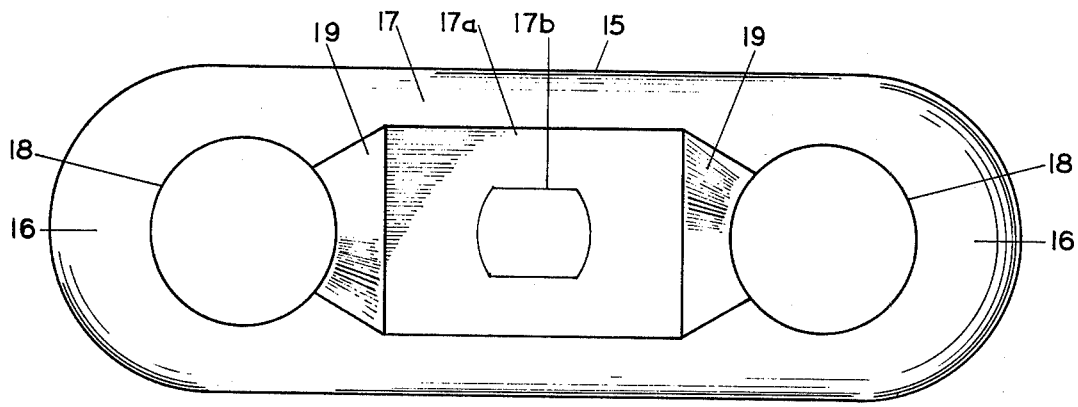
FIG. 4 is a top view of an attachment link of the type employed in my preferred chain assembly.
Figure 5:
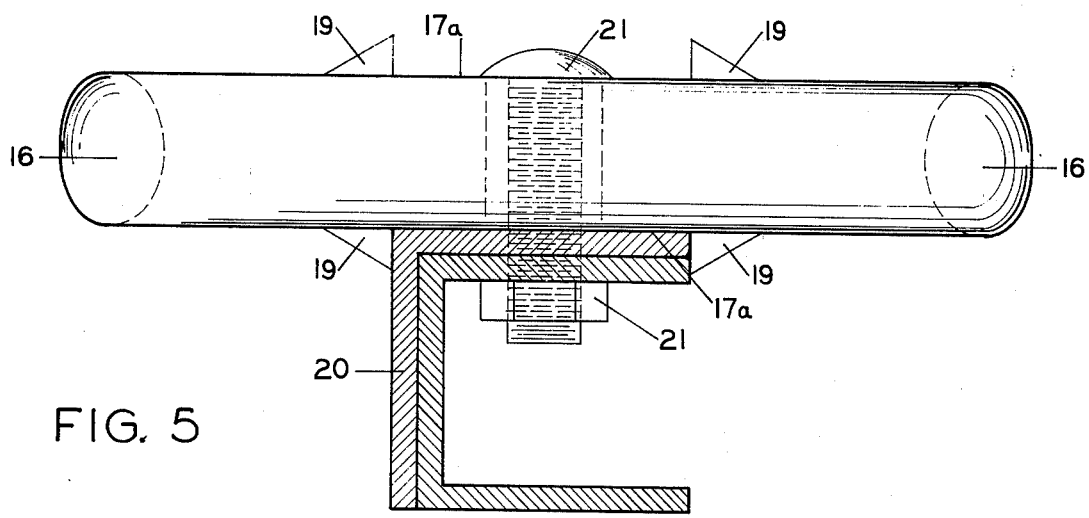
FIG. 5 is a side view of an attachment link with a conveyor flight fastened thereto.

FIGS. 4 and 5 show in detail the preferred configuration of my attachment link 15. The attachment link is a single piece of elongated steel or alloy, and is symmetrical about its center. Because of this symmetry, my attachment link 15 is both horizontally and vertically reversible.

The top view provided by FIG. 4 shows the structural features through which the attachment link 15 may be joined to adjacent drive links 10, and to a conveyor flight 20, comprising a linear arrangement of three discrete apertures within the perimeter body of the link. The perimeter body defines an outer loop 16 at each of the lateral extremities of the attachment link 15, which outer loops in turn define outer apertures 18 in the link 15. The outer loops 16 are substantially toroidal in shape, except for that portion of each loop 16 which is coincident with the center section 17 of the attachment link 15. The toroidal outer loops 16 each have a diameter less than the distance between the hook portions 11 and the body center 12 of the drive links 10, and the attachment link outer apertures 18 each have a diameter which is greater than that of the drive link hook portions 11. Accordingly, the drive link hook portions 11 may be manually extended through the attachment link outer apertures 18 to engage the toroidal outer loops 16 as shown in FIGS. 1 and 2. When so connected, the links may pivot freely in either the vertical or horizontal plane as required in use.

The center section 17 of the attachment link includes a flight surface 17a, which is preferably a plane surface as shown, on each side of the link to transversely engage a conveyor flight 20, as best illustrated in FIG. 5. A nut-and-bolt combination 21 or other fastener means may be used to fasten the flight 20 to either of the flight surfaces 17a through the middle aperture 17b. In the preferred embodiment of the attachment link 15, retaining shoulders 19 extend transversely across the link on either side of each flight surface 17a for longitudinally locating and retaining the conveyor flight on the flight surface during load conditions.

In use, my drive links 10 and attachment links 15 are connected together in alternating fashion, and flights 20 are secured to selected attachment links 15, as illustrated in FIG. 2, to provide a flighted conveyor chain 9 of the desired length. Drive sprockets and idler sprockets are provided in a conventional manner as required to provide the desired path of travel for the conveyor. FIG. 1 illustrates the relation between the links of my conveyor chain 9 and a conveyor sprocket, which may be either a drive sprocket 23 as shown or an idler sprocket. When power is applied to the drive sprocket 23, the chain 9 and the attached conveyor flights 20 will be driven to convey material as required.

As individual flights 20 of the conveyor are damaged or become worn during heavy use, such flights may be easily replaced with common tools and without requiring disassembly of the conveyor chain 9. In the event any of the links of the chain become damaged or worn, or in the event it is desired to lengthen or shorten the conveyor chain, the chain links may be manually disconnected, replaced, removed or added at any position along the chain that is convenient. The drive links 10 may be switched end-for-end because of their end-to-end symmetry. The attachment links 15 may be switched end-for-end, and also upper-to-lower because of their lateral and vertical symmetry. Accordingly, wear can be distributed over the surfaces of the chain links to maximize their useful life.

It is understood that my invention is not confined to the particular construction of parts herein illustrated and described for exemplification, but embraces all such modified forms thereof as come within the scope of the following claims.

I claim:

1. A conveyor chain articulatable in two planes transversely of each other and normal to the direction of chain advancement, comprising:
   a. at least one elongated driving link having a rigid body with, (1) a body center defining a center aperture for receiving a sprocket cog in driving relation, and (2) a hook portion extending from each end of the body and curving transversely toward the body center in spaced relation thereto;
   b. at least one elongated attachment link having, (1) a perimeter body defining a toroidal shaped outer loop at each end thereof for removably engaging a driving link hook portion, and (2) a center section for engaging a conveyor flight without interference with a drive link hook portion engaged within an outer loop, (3) said attachment link center section having a flight surface and transverse retaining shoulders on each side of the link and being symmetrical about its center to permit location and engagement of a conveyor flight on either side of the link to permit said attachment link to be reversed side for side to reduce wearing and prolong its useful life, (4) said retaining shoulders extending transversely across the link on each side of the flight surface for longitudinally locating and retaining a conveyor flight on either side, and (5) said attachment link center section having a middle aperture extending therethrough for receiving fastener means to secure the conveyor flight to the attachment link; and
   c. said hook portions of the driving link being substantially circular in cross-section and spaced from the body center a greater distance than the thickness of the toroidal outer loops to permit manual engagement and disengagement of said outer loops and said hook portions for connecting said driving and attachment links in alternating order and permit transverse bi-planar articulation between engaged links.

* * * * *